United States Patent
Cui et al.

(10) Patent No.: US 10,203,545 B2
(45) Date of Patent: Feb. 12, 2019

(54) DISPLAY PANELS AND POLARIZERS THEREOF

(71) Applicant: Wuhan China Star Optoelectronics Technology Co., Ltd., Wuhan, Hubei (CN)

(72) Inventors: Hongqing Cui, Guangdong (CN); Guowei Zha, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 171 days.

(21) Appl. No.: 15/308,326

(22) PCT Filed: Sep. 14, 2016

(86) PCT No.: PCT/CN2016/099051
§ 371 (c)(1),
(2) Date: Nov. 1, 2016

(87) PCT Pub. No.: WO2018/040134
PCT Pub. Date: Mar. 8, 2018

(65) Prior Publication Data
US 2018/0188598 A1    Jul. 5, 2018

(30) Foreign Application Priority Data
Aug. 29, 2016    (CN) .......................... 2016 1 0755058

(51) Int. Cl.
*G02F 1/1335* (2006.01)
*G02B 5/30* (2006.01)
*G02F 1/1368* (2006.01)

(52) U.S. Cl.
CPC ......... *G02F 1/133528* (2013.01); *G02B 5/30* (2013.01); *G02F 1/1335* (2013.01);
(Continued)

(58) Field of Classification Search
CPC .......................................... G02F 2001/133548
See application file for complete search history.

(56) References Cited

U.S. PATENT DOCUMENTS

2011/0168999 A1    7/2011  Kim
2013/0015482 A1*   1/2013  Su .......................... H01L 33/507
                                                           257/98
(Continued)

FOREIGN PATENT DOCUMENTS

CN    103792741 A    5/2014
CN    105700212 A    6/2016

*Primary Examiner* — Kendrick Hsu
(74) *Attorney, Agent, or Firm* — Andrew C. Cheng

(57) ABSTRACT

The present disclosure relates to a display panel and the polarizer thereof. The polarizer includes a dielectric layer and a wire grid structure array arranged on the dielectric layer. Each of the wire grid structures includes three first wire grid units and a second wire grid unit. The first wire grid units and the second wire grid unit respectively include a plurality of wire grids spaced apart from each other. By configuring the grid-spaces and the duty cycle ratio of the first wire grid unit and the second wire grid unit corresponding to the R sub-pixel, the G sub-pixel, the B sub-pixel, and the W sub-pixel, the white CIE composited by the R sub-pixel, the G sub-pixel, and the B sub-pixel and the white CIE of the W sub-pixel may be matched so as to enhance the white-point drifting issue of the display device.

9 Claims, 2 Drawing Sheets

(52) U.S. Cl.
CPC ...... *G02F 1/1368* (2013.01); *G02F 1/133512* (2013.01); *G02F 1/133514* (2013.01); *G02F 2001/133519* (2013.01); *G02F 2001/133548* (2013.01)

(56) References Cited

U.S. PATENT DOCUMENTS

2013/0300986 A1    11/2013    Kang
2016/0170261 A1    6/2016     Nam

* cited by examiner

DISPLAY PANELS AND POLARIZERS THEREOF

BACKGROUND OF THE INVENTION

1. Field of the Invention

The present disclosure relates touch panel manufacturing technology, and more particularly to a display panel and the polarizer thereof.

2. Discussion of the Related Art

The liquid crystal devices (LCDs) have been the most popular display devices due to great image restoration. However, the transmission rate of the LCD may be as low as below 5% as most of light is filtered by the liquid crystal layer, the polarizer, and the photo-resists. Such low transmission rate is not acceptable for portable devices, such as cellular phones and tablets. RGBW technology relates to configure additional W pixel into the conventional RGB photo-resist arrangement. With respect to the W pixel, a high transmission rate OC flatten layer is adopted to replace the photo-resist layer having a low transmission rate. Compared to the conventional RGB pixel arrangement, the RGBW technology has advantages in high brightness and low power consumption. However, as parts of the white backlight passes through the W pixel composed of the OC flatten layer, its corresponding output chromaticity coordinates are defined by the transmission spectrum of OC layer and is less flexible in tunability. A difference may exist between the white light passing through the white chromaticity coordinates (CIE) of the W pixel and those passing the RGB pixels. The white CIE of the display module is the mixed of the white CIE of the W pixel and the white CIE of the RGB pixel, and thus the white CIE of the RGBW display device is different from the white CIE of the RGB display device. In particular, the CIE varies with the input grayscales. This undoubtedly deteriorates the image restoration of the RGBW display device, and thus appropriate technical solution has to be adopted to match the white CIE composited by the RGB sub-pixels and the white CIE of the W sub-pixel.

SUMMARY

To address the aforementioned problems, the proposed display panel and the polarizer thereof are capable of matching the white CIE of the RGB sub-pixels with the white CIE of the W sub-pixel.

In one aspect, a polarizer includes: an dielectric layer and a wire grid structure array arranged on the dielectric layer, wherein the wire grid structure array includes a plurality of wire grid structures, each of the wire grid structures includes three first wire grid units and a second wire grid unit, and the first wire grid units and the second wire grid unit respectively includes a plurality of wire grids spaced apart from each other, wherein the first wire grid units and the second wire grid unit are configured to respectively converts incident light beams to obtain polarized light beams.

Wherein wire grid periods of the first wire grid unit and the second wire grid unit are respectively in a range from 20 nm to 500 nm, and duty cycle ratios of the first wire grid unit and the second wire grid unit are respectively in a range from 0.1 to 0.9.

Wherein a cross-section of the wire grids along a direction perpendicular to the dielectric layer and the wire grid is square, trapezium, or triangular.

Wherein the wire grid is made by aluminum, silver or gold.

In another aspect, a display panel includes: a backlight module, and a down substrate, a liquid crystal layer, and a top substrate arranged on the backlight module in sequence, the top substrate includes a photo-resist layer and a top polarizer on the photo-resist layer, the down substrate includes a down polarizer, and the polarizer as claimed in claim 1, the polarizer is arranged on a thin film transistor (TFT) array, and the wire grid structure array is arranged between the dielectric layer and the backlight module, the photo-resist layer includes a plurality of pixels, each of the pixels includes at least one R sub-pixel, one G sub-pixel, one B sub-pixel, and one W sub-pixel, and the R sub-pixel, the G sub-pixel, and the B sub-pixel respectively corresponds to one first wire grid unit, and the W sub-pixel corresponds to one second wire grid unit.

Wherein gaps between any two adjacent wire grid units of each of the wire grid structures are the same.

Wherein the photo-resist layer includes a non-pixel unit having black matrixes (BMs) arranged between the R sub-pixel, the G sub-pixel, the B sub-pixel, and the W sub-pixel.

Wherein a projection of the BM on the polarizer is between two adjacent wire grid units.

Wherein the top substrate also includes an over coat (OC) flatten layer between the photo-resist layer and the liquid crystal layer and a base between the photo-resist layer and the top polarizer.

By configuring the grid-spaces and the duty cycle ratio of the first wire grid unit and the second wire grid unit corresponding to the R sub-pixel, the G sub-pixel, the B sub-pixel, and the W sub-pixel, the white CIE composited by the R sub-pixel, the G sub-pixel, and the B sub-pixel and the white CIE of the W sub-pixel may be matched so as to address the white-point drifting issue of the display device.

DETAILED DESCRIPTION OF THE EMBODIMENTS

Figure 1:
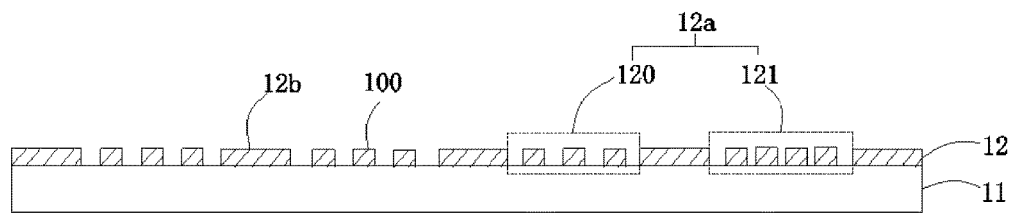
FIG. 1 is a schematic view of the polarizer of the display panel in accordance with a first embodiment

Various example embodiments will now be described more fully with reference to the accompanying drawings in which some example embodiments are shown. In the drawings, the thicknesses of layers and regions may be exaggerated for clarity. In the following description, in order to avoid the known structure and/or function unnecessary detailed description of the concept of the invention result in confusion, well-known structures may be omitted and/or functions described in unnecessary detail.

First Embodiment

Figure 2:
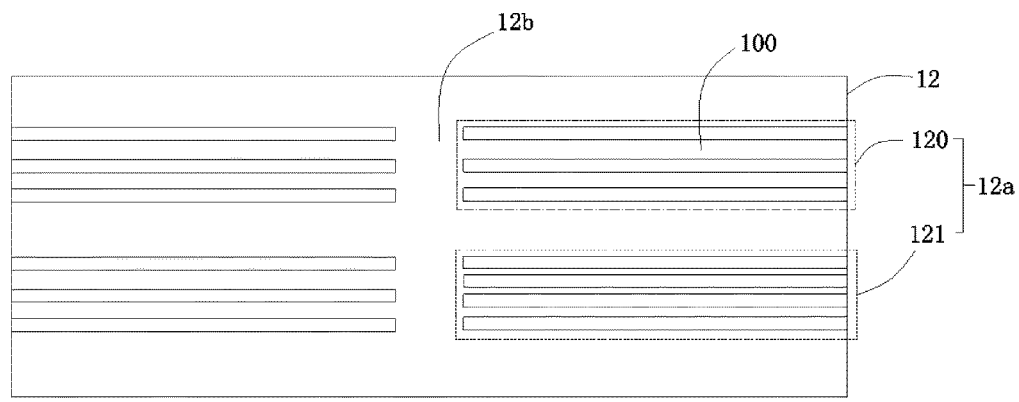
FIG. 2 is a schematic view of the wire grid layer of the polarizer of FIG. 1.

Referring to FIGS. 1 and 2, the color filter 1 includes an dielectric layer 11 and a wire grid layer 12 on the dielectric layer 11. The wire grid layer 12 is arranged with a wire grid structure array including a plurality of wire grid structures 12a. Each of the wire grid structures 12a includes three first wire grid units 120 and one second wire grid unit 121. The first wire grid unit 120 and the second wire grid unit 121 respectively includes a plurality of wire grids 100 spaced apart from each other. The first wire grid unit 120 and the second wire grid unit 121 converts the incident light beams into linearly polarized light.

Specifically, the wire grid layer 12 includes a transparent area and a non-transparent area 12b. The transparent area is configured as an array. The wire grid structures 12a is configured within the transparent area. The wire grid layer 12 is made by materials having greater imaginary part of reflective index, such as aluminum, silver or gold. Preferably, the wire grid layer 12 may be made by aluminum. The dielectric layer 11 may be made by $SiO_2$, $SiO$, $MgO$, $Si_3N_4$, $TiO_2$, and $Ta_2O_5$. When the incident light beams enter the wire grid layer 12, the wire grid structures 12a allow the light beams having a polarized direction perpendicular to the wire grid 100 to pass through. The light beams having the polarized direction parallel to the wire grid 100 are reflected, such that the incident light beams are converted into the linearly polarized light.

The wire grid period of the first wire grid unit 120 and the second wire grid unit 121 are respectively in a range from 20 to 500 nm. A duty cycle ratio of the first wire grid unit 120 to the second wire grid unit 121 is in a range from 0.1 to 0.9. The wire grid period relates to a distance between geometric centers of two adjacent wire grids 100. The duty cycle ratio relates to a ratio of the width of the wire grid 100 to the wire grid period. The width of the wire grid 100 is in a range from 10 to 500 nm. The wire grid period and the duty cycle ratio of the three first wire grid units 120 and the second wire grid unit 121 may be the same or may be different. The wire grid 100 is bar-shaped, and the cross-section of the wire grids along a direction perpendicular to the dielectric layer 11 and the wire grid 100 may be square, trapezium, or triangular.

Different transmission rates with respect to the light beams having different wavelengths may be obtained by configuring the wire grid periods and the duty cycle ratios of each of the wire grid units.

Figure 3:
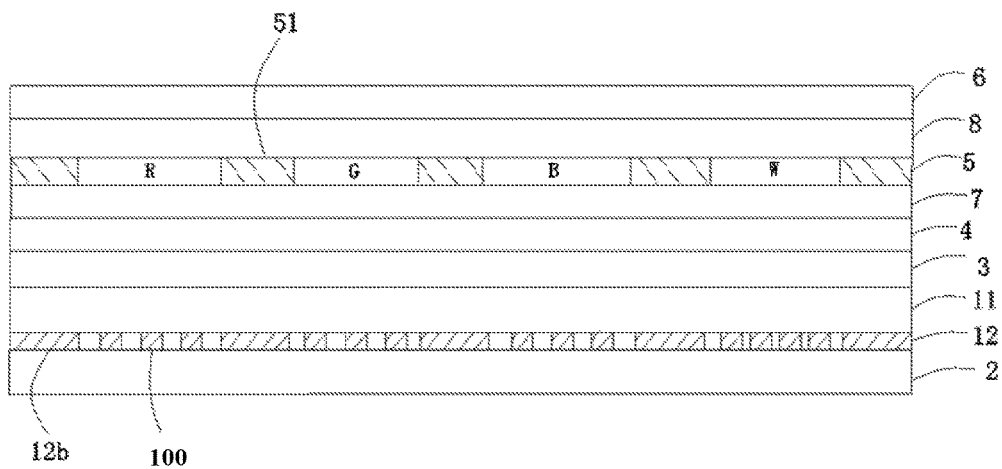
FIG. 3 is a schematic view of the display panel in accordance with the first embodiment.
Figure 4:
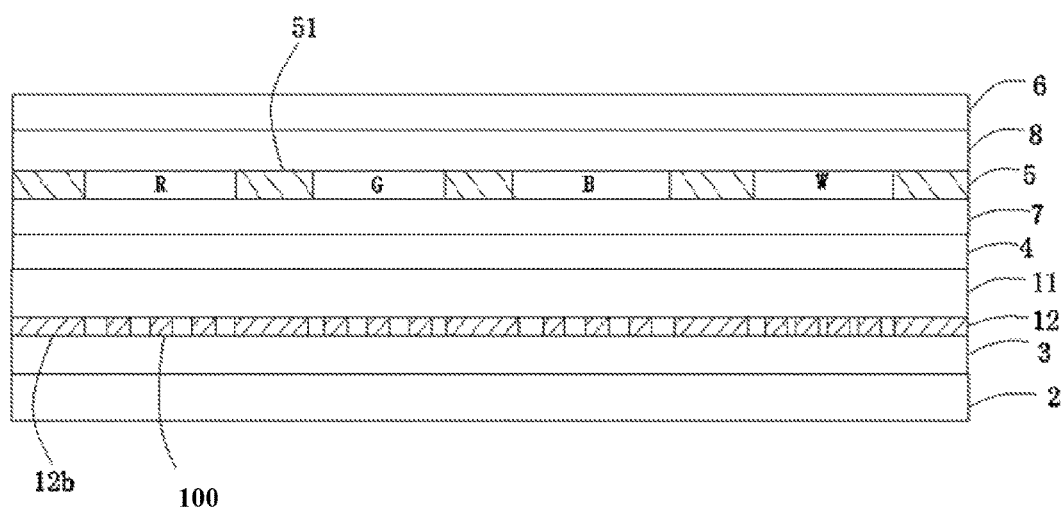
FIG. 4 is a schematic view of the display panel in accordance with a second embodiment

Referring to FIG. 3, a display device includes a backlight module 2 and a down substrate, a liquid crystal layer 4, and a top substrate arranged on the backlight module 2 in sequence. The top substrate includes a photo-resist layer 5 and a top polarizer 6 on the photo-resist layer 5. The down substrate includes a TFT array 3 and a polarizer 1 between the TFT array 3 and the backlight module 2, wherein the wire grid layer 12 is arranged between the dielectric layer 11 and the backlight module 2. The polarized direction of the top polarizer 6 is perpendicular to the polarized direction of the polarizer 1, wherein the backlight module 2 may be of an edge-type backlight module or a direct-lit backlight module.

Specifically, the photo-resist layer 5 includes a plurality of pixels spaced apart from each other forming a display area of the display panel. Each of the pixels corresponds to one wire grid structures 12a. Gaps between any two of the adjacent wire grid units within each of the wire grid structures 12a are the same, wherein each of the pixels is formed by R sub-pixel, G sub-pixel, B sub-pixel, and W sub-pixel spaced apart from each other. Each of the sub-pixels corresponds to one wire grid unit, wherein the R sub-pixel, the G sub-pixel, and the B sub-pixel respectively corresponds to one first wire grid unit 120, and the W sub-pixel corresponds to one second wire grid unit 121. The R sub-pixel, the G sub-pixel, the B sub-pixel are respectively filled with photo-resist materials of different colors to respectively display red, green, and blue colors. The W sub-pixel is filled with OC materials characterized by high transmission rate, and the OC materials are configured to emit white light beams via the backlight module 2, wherein the arrangement of the R sub-pixel, the G sub-pixel, the B sub-pixel, and W sub-pixel may be configured in accordance with real scenario, that is, the arrangement of the R sub-pixel, the G sub-pixel, the B sub-pixel, and W sub-pixel is not limited to FIG. 3.

The photo-resist layer 5 also includes a non-pixel unit forming a non-display area of the display panel. The non-pixel area includes a black matrix (BM) 51 configured between the R sub-pixel, the G sub-pixel, the B sub-pixel, and the W sub-pixel. The BM 51 is configured to arrange data lines and the scanning lines (not shown). The BM 51 is configured to avoid the optical leakage in a rim of the R sub-pixel, the G sub-pixel, the B sub-pixel, and the W sub-pixel, wherein the width of the BM 51 equals to the width of the corresponding non-transparent area 12b. That is, the projection of the BM 51 on the polarizer 1 is between two adjacent wire grid unit. In addition, the top substrate also includes an OC flatten layer 7 between the photo-resist layer 5 and the liquid crystal layer 4 and a base 8 between the photo-resist layer 5 and the top polarizer 6.

By configuring the grid-spaces and the duty cycle ratio of the first wire grid unit 120 and the second wire grid unit 121 corresponding to the R sub-pixel, the G sub-pixel, the B sub-pixel, and the W sub-pixel, the white CIE composited by the R sub-pixel, the G sub-pixel, and the B sub-pixel and the white CIE of the W sub-pixel may be matched so as to enhance the white-point drifting issue of the display device.

Second Embodiment

The difference between this embodiment and the first embodiment resides in that the color filter 1 is arranged between the TFT array 3 and the liquid crystal layer 4, and the wire grid layer 12 is arranged between the dielectric layer 11 and the TFT array 3. The top polarizer 6 may be the polarizer 1.

By configuring the grid-spaces and the duty cycle ratio of the first wire grid unit 120 and the second wire grid unit 121 corresponding to the R sub-pixel, the G sub-pixel, the B sub-pixel, and the W sub-pixel, the white CIE composited by the R sub-pixel, the G sub-pixel, and the B sub-pixel and the white CIE of the W sub-pixel may be matched so as to enhance the white-point drifting issue of the display device.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:
1. A polarizer, comprising:
an dielectric layer and a wire grid structure array arranged on the dielectric layer, wherein the wire grid structure array comprises a plurality of wire grid structures, each of the wire grid structures comprises three first wire grid units and a second wire grid unit, and the first wire grid units and the second wire grid unit respectively comprises a plurality of wire grids spaced apart from each other, wherein a wire grid period of the first wire grid unit is different from a wire grid period of the second wire grid unit, and the first wire grid units and the second wire grid unit are configured to respectively converts incident light beams to obtain polarized light beams.

2. The polarizer as claimed in claim 1, wherein the wire grid periods of the first wire grid unit and the second wire grid unit are both in a range from 20 nm to 500 nm, and duty cycle ratios of the first wire grid unit and the second wire grid unit are respectively in a range from 0.1 to 0.9.

3. The polarizer as claimed in claim 1, wherein a cross-section of the wire grids along a direction perpendicular to the dielectric layer and the wire grid is square, trapezium, or triangular.

4. The polarizer as claimed in claim 1, wherein the wire grid is made by aluminum, silver or gold.

5. A display panel, comprising:
a backlight module, and a down substrate, a liquid crystal layer, and a top substrate arranged on the backlight module in sequence, the top substrate comprises a photo-resist layer and a top polarizer on the photo-resist layer, the down substrate comprises the polarizer as claimed in claim 1, the polarizer is arranged on a thin film transistor (TFT) array, and the wire grid structure array is arranged between the dielectric layer and the backlight module, the photo-resist layer comprises a plurality of pixels, each of the pixels comprises at least one R sub-pixel, one G sub-pixel, one B sub-pixel, and one W sub-pixel, and the R sub-pixel, the G sub-pixel, and the B sub-pixel respectively corresponds to one first wire grid unit, and the W sub-pixel corresponds to one second wire grid unit.

6. The display panel as claimed in claim 5, wherein gaps between any two adjacent wire grid units of each of the wire grid structures are the same.

7. The display panel as claimed in claim 5, wherein the photo-resist layer comprises a non-pixel unit having black matrixes (BMs) arranged between the R sub-pixel, the G sub-pixel, the B sub-pixel, and the W sub-pixel.

8. The display panel as claimed in claim 7, wherein a projection of the BM on the polarizer is between two adjacent wire grid units.

9. The display panel as claimed in claim 5, wherein the top substrate also comprises an over coat (OC) flatten layer between the photo-resist layer and the liquid crystal layer and a base between the photo-resist layer and the top polarizer.

* * * * *